Sept. 22, 1959            H. EBERT            2,905,150

CONTROL FOR HYDRAULIC TRANSMISSIONS

Filed Sept. 13, 1954                          5 Sheets-Sheet 1

INVENTOR:
Heinrich Ebert

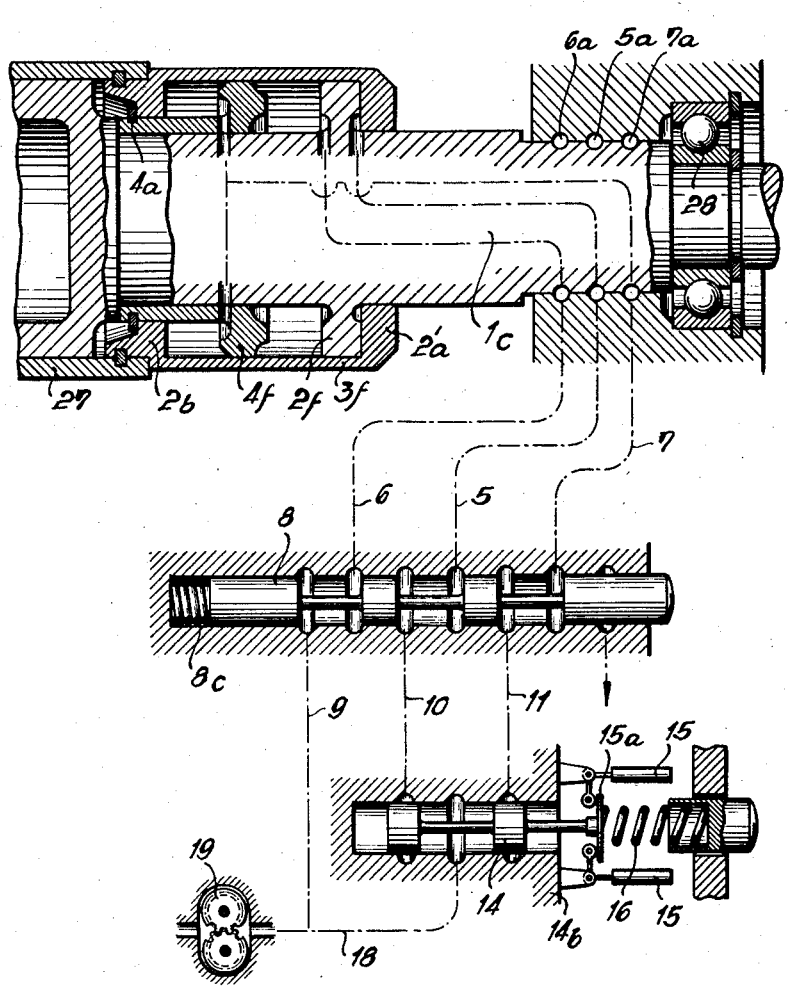

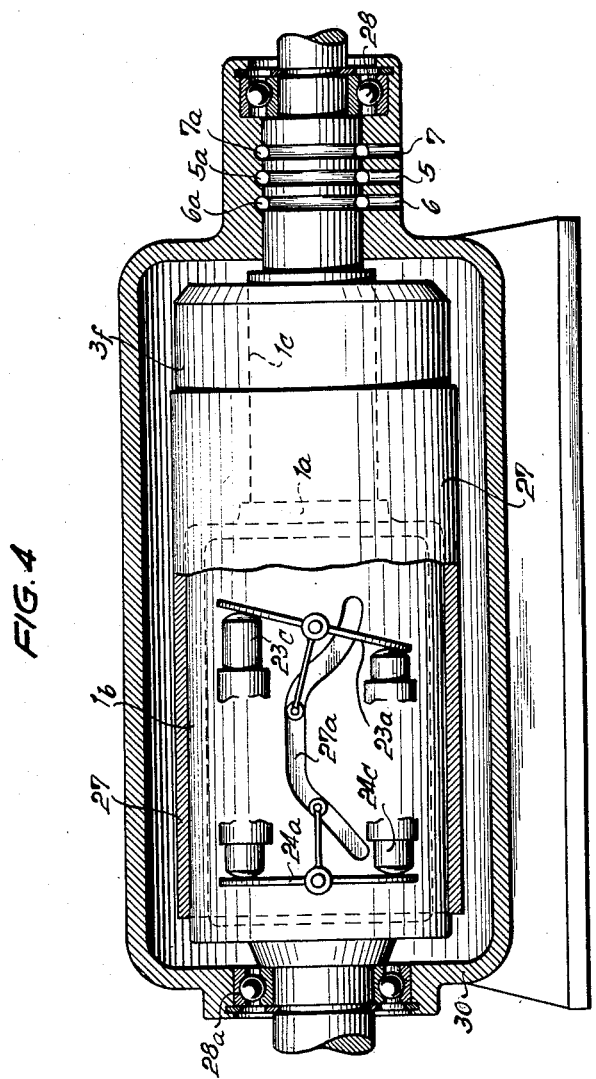

United States Patent Office 2,905,150
Patented Sept. 22, 1959

2,905,150

CONTROL FOR HYDRAULIC TRANSMISSIONS

Heinrich Ebert, Furth, Germany

Application September 13, 1954, Serial No. 455,437

Claims priority, application Germany September 16, 1953

4 Claims. (Cl. 121—38)

The present invention relates to controls and, more specifically, to a hydraulic piston control device, as it is used, for instance, for adjusting the step-down ratio of infinitely variable hydrostatic fluid step-down transmissions. Such a device consists primarily of a hydraulically actuated piston which works in a cylinder.

As is know, the step-down ratio of infinitely variable hydrostatic fluid step-down transmissions is determined by the ratio of the respective maximum strokes of the primary pistons to those of the secondary pistons.

With axial piston transmissions, the respective maximum piston stroke depends on the tilting angle of the piston drums relative to the drive shaft (Thoma-Transmissions), or relative to the swash plates (Janney-Transmissions), whereas with radial piston transmissions, the respective maximum piston stroke depends on the eccentricity of the piston paths or guides for the pistons.

Depending on the design of the piston control device, the cylinder may be stationary, and the movable piston may, through the intervention of a piston rod and corresponding levers or coulisses, effect the adjustment or control of the members determining the piston stroke. However, if desired, the piston may be held stationary and the then movable cylinder may effect the adjustment or control of said members.

Generally, the piston strokes of the hydraulic piston control device are usually so dimensioned that the fluid drive can be adjusted from the forward range to the rearward range.

The hydraulic piston control device is in such an instance hydraulically controlled by a control slide or valve which, depending on the particularly intended purpose, is actuated manually, or automatically through the intervention of a speed governor or a pressure governor.

Generally, it is not possible in the outermost or limit positions to prevent a reversing of the transmission from the forward range to the rearward range, or to adjust the step-down ratio $n_2:n_1=0$ when $n_2$ indicates the output speed and $n_1$ indicates the input speed of the transmission. In order to prevent such reversal and, particularly, when employing such transmission in motor vehicles to assure a safe stopping of the vehicle, it is the practice to employ restoring mechanisms of the hydraulic piston control arrangement to the control valve, which in many instances are undesired from a constructional standpoint, particularly when the piston control device rotates, for instance, with the output shaft in order to adjust thereby the rotating swash discs.

Also in other instances, such restoring or follow-up mechanisms are undesired, for instance, when any transmission is involved which can be controlled by a speed governor in the forward as well as in the rearward range.

It is, therefore, an object of the present invention to provide a control adapted for use in connection with fluid transmissions, which will overcome the above-mentioned drawbacks.

It is another object of this invention to provide a control for use in connection with fluid transmissions, which will prevent the undesired reversing from forward speed to rearward speed.

It is still another object of this invention to provide a control of the above-mentioned type which will make it possible properly to adjust fluid step-down transmissions to $n_2:n_1=0$, or any other fixed step-down ratio, especially during the control operation, without returning from the hydraulic control piston device to the control valve.

These and other objects and advantages of the invention will appear more clearly from the following specification in connection with the accompanying drawings, in which:

Fig. 1 diagrammatically represents a hydraulic piston control device according to the invention.

Figs. 3a and 3b represent a still further modified hydraulic piston control device according to the invention, and respectively show said device in its two end positions.

Fig. 4 shows the detail of an arrangement for use in connection with Fig. 3.

*General arrangement*

According to the present invention, the undesired shifting from forward speed to rearward speed is prevented or the proper adjustment of fluid step-down transmissions to $n_2:n_1=0$ or any other fixed step-down ratio, especially during the control operation, is, without return from the hydraulic piston control device to the control valve, effected by the employment of an additional piston. The arrangement is such that this piston, due to abutments acting only upon this additional piston, makes possible an adjustment first only in a free step-down range and allows an adjustment to another step-down range only after the shifting of a further valve, and vice versa.

A further feature of the invention, particularly when employing speed control transmissions in motor vehicles, consists in that the shifting of the reversing valve can be effected only in connection with an increase of the control speed.

*Structural arrangement*

Figure 1:
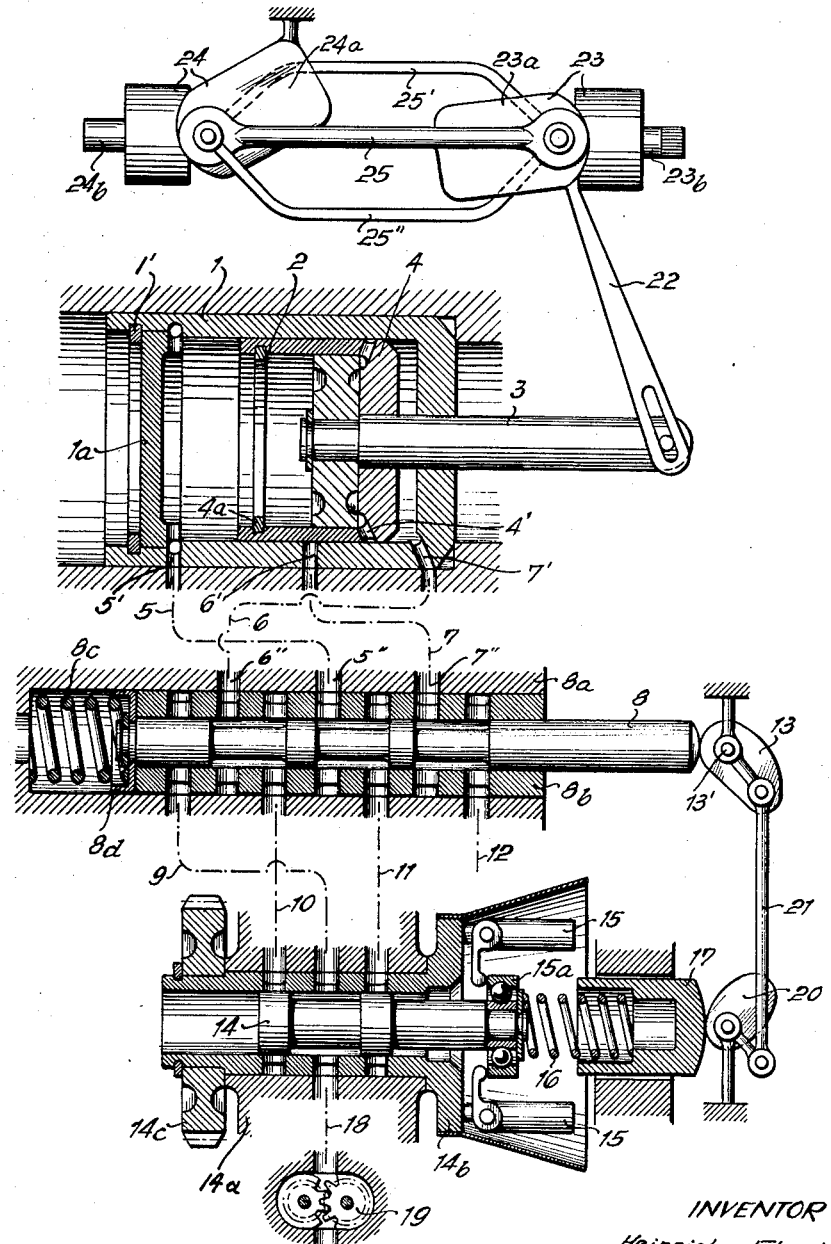

Referring now to the drawings in detail and Fig. 1 thereof in particular, the arrangement shown therein comprises a hydraulic piston control device which includes a cylinder 1, a piston 2, with a piston rod 3 and an additional piston 4. In this instance, the cylinder 1 is held stationary. The right-hand side of cylinder 1 is provided with a bore in the cylinder bottom through which passes the longitudinally displaceable piston rod 3. The left-hand side of the cylinder 1 is closed by a pressed-in lid 1a.

The piston 2 is axially displaceable within the piston 4 by means of the piston rod 3 to which it is fixedly connected. The displacement of the piston 2 within the piston 4 is limited on the right-hand side by the piston 4 itself and on the left-hand side by the abutment ring 4a. The piston 4 is longitudinally displaceable in the cylinder 1. The displacement of the piston 4 within the cylinder 1 is limited on the left-hand side by the abutment ring 1a and on the right-hand side by the bottom of the cylinder 1. The cylinder 1 is provided with bores 5', 6' and 7' respectively communicating with conduits 5, 6 and 7. The conduits 5, 6 and 7 have their other ends in communication with corresponding bores 5'', 6'' and 7'' provided in the valve casing 8a. Pressed into the casing of the valve 8a is a bushing 8b provided with annular grooves and with bores as is customary in connection with valves so that in the position shown in Fig. 1 of the valve spool 8, the conduit 6 will communicate with a conduit 10, while the conduit 5 will communicate with a conduit 11, and the conduit 7 will communicate with a conduit 12. The valve spool 8 is held in the position shown in the drawing by means of the spring 8c in the bore of the valve casing and by means of the spring disc 8d.

When the valve spool 8 is moved toward the left by a counter-clockwise tilting movement of the cam disc 13 about stud 13', the valve spool 8 will effect communication between the conduit 5 and the conduit 19 and will establish communication of the conduit 6 with the conduit 9, while the conduit 7 will then communicate with the conduit 11.

The conduits 9, 10 and 11 are adapted to effect communication of the corresponding bores of the valve casing 8a with corresponding bores of the speed governor casing 14a. Rotatably mounted in the governor casing 14a is the sleeve 14b which is adapted to be driven through the intervention of the gear 14c connected to said sleeve 14b. Easily rotatably and axially displaceable in the sleeve 14b is the valve spool 14 which is held in the position shown in the drawing when the force exerted by the fly weights 15 upon the ball bearing 15a and the force exerted by the spring 16 balance each other. The said fly weights 15 rotate together with the sleeve 14b.

When the thrust of the spring 16 is increased by moving the control member 17 toward the left, or if the speed of rotation of the fly weights is too low, the valve spool 14 is moved toward the left. In this position, the conduit 18 will be connected to the conduit 10 by the control spool 14.

If, on the other hand, the thrust of the spring 16 is reduced when the control member 17 moves toward the right, or if the speed of rotation of the fly weights is too high, the valve spool 14 will be moved toward the right. In this right-hand position, the conduit 18 will be connected to the conduit 11 by the valve spool.

The conduit 18 leads to a gear pump 19 which delivers the control oil. The conduit 18 is in continuous communication with the conduit 9 through the intervention of the valve sleeve 14b.

The displacement of the speed control sleeve 14b and, therefore, the variation of the speed of rotation is effected by actuation of the cam disc 20. This cam disc is so designed that when the latter is rotated in counter-clockwise direction, the control member 17 is first moved toward the left, thereby bringing about an increase in the speed of rotation. When further tilting the cam disc 20 in the same direction, the control member 17 will move again toward the right, which means that the speed of rotation is again reduced. By correspondingly designing the cam disc 13 for the shifting of the spool 8, and by coupling the two cam discs together through the crank drive 21, the spool 8 can be shifted only after the maximum controllable speed of rotation has been exceeded. This is important from the safety standpoint because a wrong actuation during the forward drive will make itself felt immediately by a howling sound of the engine. Pivotally connected to the piston rod 3 is a tiltable lever 22 connected to the tilting frame 23a pertaining to the pump 23 so that depending on the pistons 2 and 4 or the piston 2 alone, the tilting frame 23a can be tilted more or less.

When the pump drive shaft 23b is driven, more or less working fluid is conveyed through the fluid conduits 25', 25'' (pressure or suction side) to the fluid operable motor 24. The tiltable frame 24a of the motor 24 is in the example of Fig. 1 arranged at a fixed angle. The output of the motor is effected through the shaft 24b.

In the position shown in the drawing of the tiltable frame 23a, no working fluid is delivered, the output speed of the motor shaft is zero.

*Operation of the arrangement of Fig. 1*

The operation of the hydraulic piston control device with the additional piston 4 and its abutments is as follows: When in the position shown in the drawing of the valve spool 8, the speed of the control sleeve 14b increases beyond the speed corresponding to the position which the spool 14 occupies in the drawing, the spool 14 is moved toward the right due to the increased centrifugal force of the fly weights 15. The control oil delivered by the control pump 19 will then flow from conduit 18 into conduit 11 and from there into conduit 5 so that due to the thus delivered oil under pressure, the pistons 2 and 4, together with the piston rod 3, will move toward the right. The oil displaced in the control cylinder 1 by the piston 4 will escape through the conduit 6, the valve spool 8 and conduit 10, around and left of the valve spool 14, and will be discharged into a sump, storage container, or the like communicating with the gear pump 19.

Due to the movement of the piston 2, the piston rod 3 actuates the lever 22, which latter tilts the tiltable frame 23a in counter-clockwise direction. As a result thereof, the pump 23 delivers working fluid through the conduits 25', 25'' so that the output shaft 24b of the motor 24 rotates in the same direction as the drive shaft 23b of the pump 23 (forward drive step-down range).

The pistons 2 and 4 can move in this direction until the piston 4 abuts the right-hand bottom of the cylinder 1. The tiltable frame 23a will then have reached its maximum positive tilting angle (1:1 or step-up). When in this position, the speed of rotation of the control sleeve 14b decreases or is too low, the valve spool 14 is moved toward the left due to the fact that now the thrust of the spring 16 exceeds the centrifugal force of the fly weights 15. As a result thereof, the control oil of the pump 19 passes through conduit 18 into the conduit 10, and in the position shown in the drawing of the spool 8, further passes into the conduit 6 so that under the influence of said oil, the piston 4 and together with the latter, also the piston 2 will be moved toward the left. This movement continues until the piston 4 has reached the position in which its further leftward movement is filled by its engagement with the cylinder lid 1a. In this position, the tiltable frame 23a will likewise have assumed the position shown in the drawing in which the pump, as mentioned above, does not feed any working fluid. This position corresponds to the standstill of the vehicle or the starting position of the forward or rearward movement.

Only if the spool 8 is now pressed toward the left and the speed of rotation of the fly weights is increased, can the control oil pass from the pump 19 through conduit 18 and conduit 11 and around the spool 8 into the conduit 7, whereby control oil will pass through a bore 4' in piston 4 into the space between the pistons 2 and 4. Inasmuch as simultaneously with the shifting of the valve spool 8, the control oil will pass with full force through conduits 18 and 9 around the valve spool 8 and through conduit 6 and will press the piston 4 having a greater effective area than the piston 2 against the ring 1a, the piston 2 will now start moving toward the left within the now stationary piston 4. The oil displaced by the piston 2 will escape through conduit 5 around the spool 8 and the conduit 10 in order to be discharged left of the valve spool 14. The leftward movement of the piston 2 is possible until the piston 2 engages the abutment ring 4a in the piston 4. In this position, the tiltable frame 23a of the pump 23 has finally reached its negative tilting angle. The pump will in this range feed working oil through the conduits 25', 25'' but in a reverse direction than before so that now the motor will run in backward direction (maximum backward speed).

If, furthermore, while the spool 8 is pressed in leftward direction, the speed of rotation of the control sleeve 14b drops, the spool 14 is moved toward the left. The control oil will then pass from pump 19 through conduits 18, 10 and 5 toward the left side of the piston 2, and will move the latter again toward the right. The oil between the pistons 2 and 4 which is without pressure will then escape through the bores 4' into the conduit 7, around the spool 8, into the conduit 11, and from there will escape around the control spool 14 through a discharge opening.

The displacement of the piston 2 toward the right is also in this instance possible only up to the position at which the piston 2 abuts the piston 4 which from the right-hand side thereof is still under full pressure of the pump (standstill of the vehicle, starting position for rearward movement).

If, finally, at still too low a speed of the control sleeve 14b, i.e., while the governor control pin is still in its left position, the valve spool is again moved toward the right, first the piston will remain in its position corresponding to the standstill position of the vehicle or starting position forward and only when the speed of the control sleeve 14b is increased, the cycle or play starts again.

Figure 2:
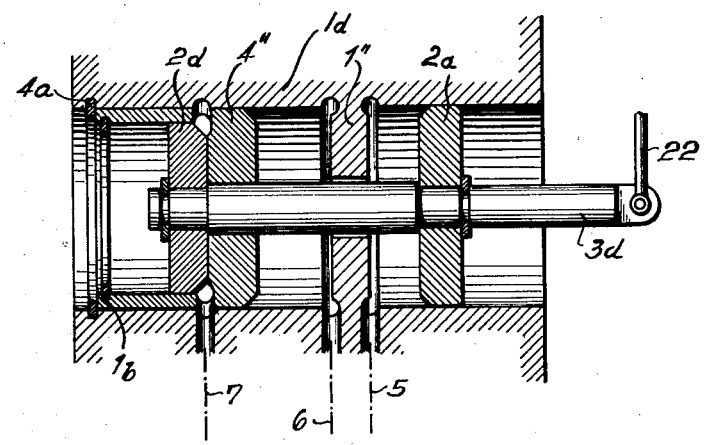
Fig. 2 is a modification of a device according to the invention.

Referring now to Fig. 2 showing a modification of the arrangement according to the invention, the cylinder 1d is likewise held stationary, but, in contrast to the arrangement of Fig. 1, is open at both ends. The cylinder 1d has only one bottom 1", namely, intermediate its ends. The bottom 1" is provided with a passage for the longitudinal displaceable piston rod 3d. Instead of the lid 1a provided in the arrangement of Fig. 1, only an abutment ring 4a is provided which serves as abutment for the additional piston 4". The piston 4" is similar to the arrangement of Fig. 1 longitudinally displaceable in the cylinder 1d, and the piston 2d is longitudinally displaceable in the piston 4". The piston 2d is fixedly connected to the piston rod 3d and is adapted together with the piston rod 3d to move relative to the piston 4" from the position shown in the drawing toward the left until it abuts the abutment ring 1b.

Instead of the cylinder lid 1a of the arrangement of Fig. 1, a further piston 2d' is connected to the piston rod 3d. The piston 2d', while longitudinally displaceable in the cylinder 1d, tightly seals the right-hand cylinder chamber.

Pivotally connected to the piston rod 3d is the tiltable arm 22. The cylinder 1d is similar to the arrangement of Fig. 1 provided with three bores which communicate with the conduits 5, 6 and 7 for the same purpose as described in connection with the arrangement of Fig. 1. The other connections correspond to those shown in Fig. 1 and described in connection therewith.

Figure 3A:
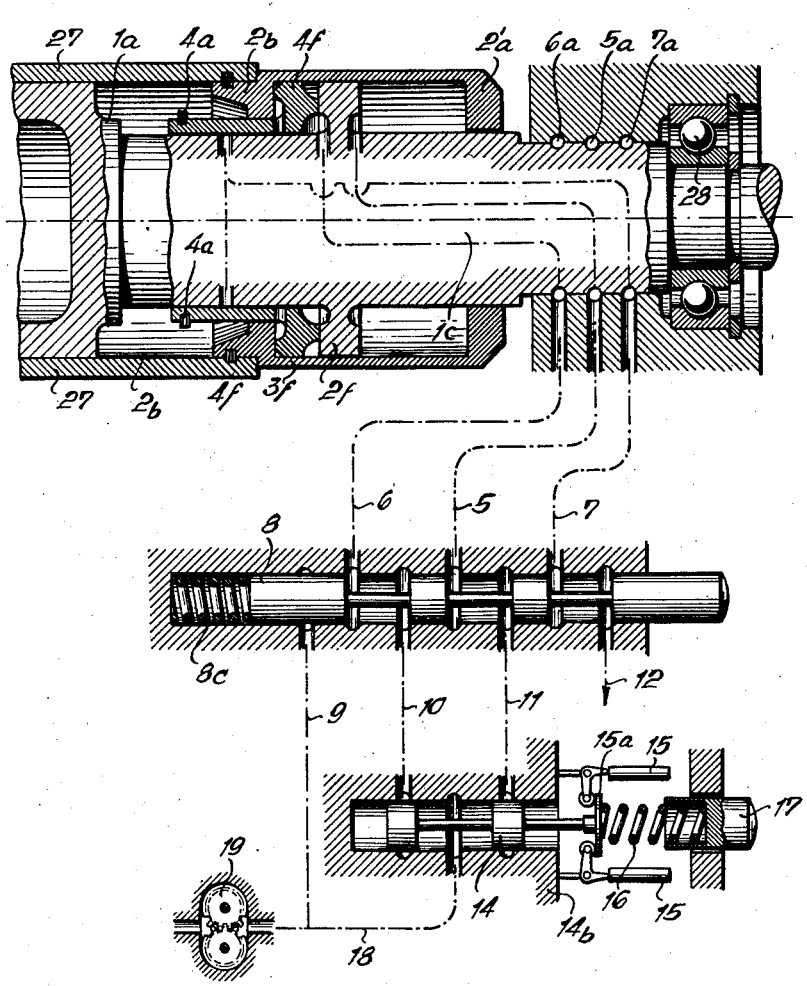

Referring now to Fig. 3a, the arrangement shown therein represents a hydraulic piston control device of which may customarily be said that the piston proper is held stationary while the movable cylinder brings about the adjustment of the elements determining the step-down ratio. However, considering the role which in this instance is played by the additional piston and considering the cooperation of said additional piston with the other pistons, it would be more correct to consider the embodiment of Fig. 3a as an arrangement conforming to that of Fig. 2 so that the cylinder is to be considered transferred inwardly and the piston rod is to be considered as transferred outwardly. In this way, the cylinder inner wall of Fig. 2 is here practically a piston rod outer wall, and the piston rod outer wall of Fig. 2 is here practically a cylinder inner wall.

Corresponding to the reference numerals designating the various structural elements of Fig. 2, and considering the properties of said elements as to their effect rather than the type of said elements, it may be said that the piston 2f with its abutment 2'a, as well as the shaft integral with piston 2f, correspond to the cylinder piston of Fig. 2. Displaceably mounted on the piston 2f is the hollow piston rod 3f with the inwardly extending pistons 2b and 2'a which, for the sake of simplicity, are shown as consisting of a single piece. Longitudinally displaceably mounted in the hollow piston rod 3f and on the cylinder shaft 1c is the additional piston 4f with its extension and abutment ring 4a. The piston 3f is displaceably mounted on the extension of the additional piston 4f.

According to Fig. 3a, the additional piston rod 3f and the piston 4f occupy their outermost right-hand position. In Fig. 3b, the piston rod 3f and piston 4f occupy their outermost left-hand position.

As will be clear from the above and from the drawing, in the right-hand control range, the piston 4f cooperates with the piston 2b, whereas in the left-hand control range, the piston 2b works alone, while the piston 2f is pressed against the abutment 2'a. Connected to the piston rod 3f is a control sleeve 27 which, as will be evident from Fig. 4, in cooperation with corresponding coulisses 22a, serves for the control of the elements determining the step-down ratio.

The hydraulic control piston arrangement is rotatably journaled together with its cylinder shaft in ball bearings 28 as will be clear from Fig. 4 and Figs. 3a and 3b. Accordingly, the conduits 5, 6 and 7, which communicate with the valve spool 8, lead through corresponding annular grooves 5a, 6a and 7a from the stationary part to the rotatable cylinder shaft and, corresponding to the operation of the device of Figs. 1 and 2, in to the bores provided in the cylinder shaft.

The valve spool 8, as well as the governor 14, 15, 15a, 16 and 17 are shown diagrammatically only inasmuch as they have the same effect as the corresponding elements in Fig. 1 so that the function of these elements need not be repeated here.

Fig. 4 in connection with Figs. 3a and 3b clearly illustrates how the cylinder shaft 1c with its abutment 1a, which latter widens leftwardly into a hollow shaft 1b is rotatably journaled in the bearings 28 and 28a in the transmission casing 30. Fig. 4 furthermore shows how in this way the hollow piston shaft 3f with the control sleeve 27 linked thereto, the coulisse guide 27a and the swash plates 23a and 24a tiltably mounted in the hollow shaft rotate together with the pistons 23c and 24c, acting upon said swash plates 23a and 24a. Furthermore, Fig. 4 shows the annular grooves 5a, 6a and 7a and the grooves 5, 6 and 7 cooperating therewith and provided in the casing 30.

It may be mentioned that in each of the examples set forth above, it is also possible to replace the speed governor by other control members such as a pressure regulator or a manually operable control valve. Furthermore, instead of the hydrostatic axial piston transmission shown in the drawing, also radial piston transmission or other infinitely variable fluid step-down or step-up transmissions may be employed.

The abutment 4a of the additional piston 4 need not necessarily correspond to the step-down ratio $n_2:n_1=0$, but may subdivide the entire step-down range of the infinitely variable fluid transmission in any desired manner into two separate step-down ranges which may be desired in view of certain prevailing conditions.

Essential for the invention is merely the feature that for controlling the step-down or step-up ratio of an infinitely variable fluid transmission, a hydraulic control piston device is employed which is equipped with an additional piston 4 and with corresponding abutments 4a, whereby on one hand a control of the step-down ratio of the fluid transmission will be possible within a limited step-down range only, and whereby a control of the step-down ratio of the fluid transmission to another step-down ratio can be effected only after a reversal of the valve spool 8.

It is, of course, understood that the present invention is by no means limited to the particular constructions shown in the drawings, but also comprises any modifications within the scope of the appended claims.

What I claim is:

1. A hydraulic control device for use in connection with an infinitely variable hydrostatic fluid transmission having an adjustable fluid control member, which comprises in combination: a cylinder, first fluid operable double acting piston means having two oppositely located effective surface areas and being reciprocably arranged within said cylinder, connecting means arranged for operatively connecting said first piston means with said fluid control member, second fluid operable piston means reciprocably arranged within said cylinder for cooperation with said first piston means, said second piston means having an effective surface area larger than either one of the effective surface areas of said first piston means, fluid passage means in said cylinder for selectively conveying pressure fluid to or releasing fluid from the said effective surface area of said second piston means or either one of the effective surface areas of said first piston means for respectively moving said control member from an intermediate position in one or the other direction or vice versa, pressure fluid conduit means arranged for connection with a pressure fluid source and communicating with said fluid passage means in said cylinder, first valve means, second valve means, said first and second valve means being arranged in said pressure fluid conduit means and being interposed between said fluid passage means and said fluid conduit means to control the flow of fluid therebetween, said first valve means being adapted to control the movement of said control member from said intermediate position in one direction and vice versa, and said second valve means being adapted to control the movement of said control member from said intermediate position in the other direction and vice versa.

2. A control device for use in connection with an infinitely variable hydrostatic fluid transmission having adjusting means to be controlled, which comprises in combination: shaft means provided with a piston portion, first sleeve means slidably mounted on said shaft means and provided with piston means adjacent to and for cooperation with said piston portion, second sleeve means provided with a first flange slidable on said shaft means on that side of said piston portion which is remote from said first sleeve means, said second sleeve means also being provided with a second flange slidable on said first sleeve means, means operatively connected to said second sleeve means for actuating said adjusting means, fluid conveying means arranged on said shaft means for selectively conveying or releasing fluid to or from either side of said piston portion and said piston means, fluid conduit means arranged for connection with a pressure fluid source and leading to said fluid conveying means, and two valve means arranged within said fluid conduit means and operable to control the flow of fluid to and from said piston portion and said piston means for respectively bringing about adjustment of said adjusting means in a first and in a second transmission range.

3. A hydraulic control device for use in connection with an infinitely variable hydrostatic fluid transmission having a controllable element, which comprises in combination: a cylinder-piston control system including stationary means and also including first fluid operable means and second fluid operable means for cooperation with said first fluid operable means; said stationary means being provided with passage means for conveying fluid to and from either side of said first and second fluid operable means; connecting means operatively connected with said first movable means and arranged for connection with said controllable element; first, second, and third fluid conduit means arranged for communication with said passage means, a fluid reservoir, means arranged to withdraw fluid from said reservoir and to deliver pressure fluid to any one of said conduit means; a first valve member controlling the flow of fluid to and from said first, second and third passage means and being adapted in a first position to effect communication between said first conduit means and said third passage means, and between said third conduit means and said second passage means, and between said first passage means and said second conduit means respectively, said valve member also being adapted in a second position to effect communication between said third conduit means and said first passage means, and between said third passage means and said second conduit means, and between said second passage means and said reservoir respectively; second valve means arranged to control the supply of pressure fluid to said first, second and third conduit means and the discharge of fluid from said second conduit means into said reservoir; governor means associated with said second valve means and operable automatically to adjust the same; first cam means arranged for actuating said first valve means; second cam means having its cam surface phase displaced with regard to the cam surface phase of said first cam means and being operable to adjust said second valve means; and lever means interconnecting said first and second cam means.

4. An arrangement according to claim 3, in which said governor is speed responsive, the phase displacement of said cams being such that said first valve means will be shifted from its first into said second position only after said first cam means has been shifted from its respective position into position for maximum speed and back to the said respective position.

References Cited in the file of this patent

UNITED STATES PATENTS

| | | |
|---|---|---|
| 1,612,007 | Furlong | Dec. 28, 1926 |
| 2,005,387 | Pelton | June 18, 1935 |
| 2,299,211 | Clench | Oct. 20, 1942 |
| 2,352,212 | Lang et al. | June 27, 1944 |
| 2,401,197 | Simpson | May 28, 1946 |
| 2,466,041 | Peoples et al. | Apr. 5, 1949 |
| 2,505,727 | Vickers et al. | Apr. 25, 1950 |
| 2,510,314 | Jirsa | June 6, 1950 |
| 2,604,878 | Stevens | July 29, 1952 |

FOREIGN PATENTS

| | | |
|---|---|---|
| 301,531 | Germany | Nov. 2, 1917 |
| 622,666 | Great Britain | May 5, 1949 |

UNITED STATES PATENT OFFICE

CERTIFICATE OF CORRECTION

Patent No. 2,905,150 September 22, 1959

Heinrich Ebert

It is hereby certified that error appears in the above numbered patent requiring correction and that the said Letters Patent should read as corrected below.

In the drawings, Sheet 1, Fig.1, numeral "7'" should read -- 6' --; and numeral "6'" should read -- 7' --; the leading line to numeral 2 should be extended to the piston fixedly connected to the piston rod 3 --;

Sheet 2, Fig. 2, numeral "2a" should read -- 2d' --;

Sheet 3, Fig. 3a, numerals "2b", "4f" and "27" appearing below sleeve 27 and also the leading lines pertaining thereto should be cancelled;

Sheet 4, Fig. 3b, numeral "1a" appearing in Fig. 3a should also be shown in Fig. 3b and should be applied to the same part as in Fig. 3a;

in the printed specification, column 3, line 72, beginning with "In the position shown" strike out all to and including "shaft is zero." in line 74, same column; column 4, line 43, beginning with "In this position," strike out all to and including "ment." in line 49, same column; column 6, line 13, for "2f" read -- 4f --; line 14, for "2'a" read -- 1a --; line 17, for "22a" read -- 27a --; lines 54 and 65, for "4a", each occurrence, read -- 1a --.

Signed and sealed this 26th day of April 1960.

(SEAL)
Attest:

KARL H. AXLINE
Attesting Officer

ROBERT C. WATSON
Commissioner of Patents